United States Patent Office 3,084,116
Patented Apr. 2, 1963

3,084,116
PRODUCTION OF THIOLS AND SULFIDES USING ANION EXCHANGE RESIN AND/OR AN EPOXY COMPOUND
Rector P. Louthan, Bartlesville, Okla., assignor to Phillips Petroleum Company, a corporation of Delaware
No Drawing. Filed Mar. 26, 1959, Ser. No. 802,031
24 Claims. (Cl. 204—158)

This invention relates to the production of thiols and sulfides. In one of its aspects, the invention relates to the use of an anion exchange resin in the production of a thiol and/or a sulfide. In another of its aspects, the invention relates to the use of an epoxy compound in the production of a thiol and/or a sulfide. In a further aspect of the invention, it relates to a production as described in the presence of activating rays using the said anion exchange resins and/or the said epoxy compounds as a promoter for the reaction. In a further and more specific aspect of the invention, in one embodiment thereof, there is prepared 3-chloropropyl n-octyl sulfide from allyl chloride and n-octyl thiol.

It has been found that the reaction of thiols and/or hydrogen sulfide with halogenated olefinic compounds to produce thiols and sulfides is promoted by effecting a liquid-phase reaction in the presence of activating rays and a promoter selected from the group consisting of an anion exchange resin and an epoxy-containing organic compound. Various anion exchange resins or alkylene oxides, such as propylene oxide, have been found useful.

Accordingly, the invention is concerned with the reaction of thiols and hydrogen sulfide with halogenated olefinic compounds forming, when hydrogen sulfide is employed, a thiol, i.e., mercaptan, and a sulfide and, when thiols are used, a sulfide. Some of the products which are obtained are halogenated sulfides which can be readily dehydrohalogenated, as later described, to yield unsaturated sulfides.

It is an object of this invention to produce a thiol. It is a further object of the invention to produce a sulfide. It is a still further object of the invention to produce a reaction product of a thiol and/or hydrogen sulfide and a halogenated olefinic compound by reacting the same in the presence of activating rays and a promoter, as herein described. It is a further object of the invention to prepare 3-chloropropyl n-octyl sulfide. It is a still further object of the invention to provide a process, as herein described, employing also in the process prior art modifiers, as later described.

Other aspects, objects and the several advantages of the invention are apparent from a study of this disclosure and the claims.

According to the invention, there is provided a method of promoting a reaction between a sulfur-containing compound which is reactive with a halogen-containing olefinic compound in the presence of activating rays to produce a compound selected from the group consisting of a thiol and a sulfide which comprises effecting the reaction in the presence of a material selected from the group consisting of an anion exchange resin and an epoxy-containing organic compound.

Thus, according to the invention, it has been found that the conversions and ultimate yields of products, as produced herein, have not been as high as desirable and that substantially higher conversions and higher ultimate yields can be obtained by effecting the reaction in the presence of an anion exchange resin and/or a saturated organic compound containing an epoxide group.

The epoxy-containing compounds which are employed are saturated organic compounds characterized by the presence of at least one epoxide group. The compounds have the structure

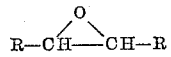

where R is hydrogen or an alkyl, including cycloalkyl, group. Further, the two R groups can represent carbon atoms in a saturated ring structure. Each R group can contain additional epoxide groups, i.e., the compounds can be polyepoxides, such as the di- and the triepoxides. Examples of these alkylene oxides are the following compounds:

Ethylene oxide
Propylene oxide
1,2-epoxybutane
3-ethyl-1,2-epoxyhexane
1,2-epoxyoctane
1,2-epoxyhexane
3,4-epoxyhexane
3,3-dimethyl-1,2-epoxybutane
1,2-epoxydecane
5,6-epoxydecane
Cyclobutane oxide
Cyclohexane oxide
1,2,7,8-diepoxyoctane
1,2,5,6-diepoxyhexane
1,2,4,5,7,8-triepoxyoctane The most preferred of these epoxy-containing compounds are those having 2 to 6, inclusive, carbon atoms.

The anion exchange compositions which I employ are organic compounds described as cross-linked polymers having positively charged functional groups. These positively charged sites bind anions, such as hydroxide, carbonate, bicarbonate, chloride, sulfate, etc. The bound anion can be reversibly exchanged, as is well known. Various anion exchange materials have been described in the literature (see, for example, Kunin and Myers, "Ion Exchange Resins," by John Wiley and Sons, Inc., New York, 1950). Also, processes for the preparation of anion exchange resins suitable in the present invention are described, for example, in U.S. Patents 2,151,883 and 2,366,007. Many of the resins are formed by polymerization of an aromatic amine and formaldehyde or a polyamine, a phenol and formaldehyde. For example, m-phenylene diamine and polyethylene diamine and formaldehyde are reacted to produce one commercial product designated as Wofatit M. Cross-linked polymers can also be prepared using a vinylpyridine monomer, such as 2-methyl-5-vinylpyridine and 2-vinyl-pyridine.

Examples of commercial products which are applicable are illustrated by the following products produced by the Rohm and Haas Company:

Amberlite 1R–4B, phenol formaldehyde polyamine type;
Amberlite 1R–45, polystyrene base polyamine type;
Amberlite 1RA400 and 1RA401, a polystyrene quaternary amine.

Still other products which are commercially available are:

DeAcidite (Permutit);
Diolite A–2 and A–3 (Chemical Process);
Dowex 2 (Dow Chemical).

These ion exchange resins are preferably added in granular form, i.e., particles having a particle size in the range between about 10 mesh and about 200 mesh. In this size range, they can be readily recovered by screening, filtration and centrifugation. However, products in sheet or membrane form can be applied. I employ these products preferably in the hydroxide form. By this, I mean that the resins are regenerated by use of a strong base, such as sodium hydroxide, potassium hydroxide and ammonium hydroxide. However, valuable results are obtained with resins regenerated with weak bases, such as sodium carbonate and sodium bicarbonate. The exchange capacity of these anion exchange resins is reported to be in the range of about 2 to 10 milliequivalents per gram. The regenerated resin is washed with water and is preferably air-dried before use.

The reaction of the thiol, including hydrogen sulfide, with the olefinic compound is effected in the liquid phase in the presence of one or more of the above-described promoters. While very small amounts of these promoters can be employed with beneficial results, generally, I prefer to use 1 to 100 grams of the promoter for each mol of the unsaturated halide reactant. The reaction is effected usually at temperatures within the range of about minus 50 to about plus 200° C. More commonly, the temperature is between 0 and 100° C. The reaction is generally effected in a closed system at pressures sufficient to maintain the reactants substantially all in the liquid phase. The reaction is exothermic and, generally, there are provided means for cooling as well as means for heating the reaction vessel.

To effect reaction, the reaction mixture is exposed to activating rays. Ultraviolet rays having a wave length in the range of 100 to 3,800 angstroms are very satisfactory. Such rays can be generated conveniently. An ultraviolet lamp containing mercury vapor has been frequently applied. The reaction can also be catalyzed by high energy ionizing rays, such as X-rays, beta rays and gamma rays. Radioactive materials, such as cobalt-60, and spent fuels provide a convenient source of such ionizing radiations.

The thiols which are employed for reaction with the halogenated unsaturates contain from 1 to 20 carbon atoms and are aliphatic, including cycloaliphatic, compounds having one —SH. One or more of these compounds can be employed simultaneously; and particularly for the higher members, the compounds may represent a mixture of isomers. Examples of these thiols include:

| | |
|---|---|
| Methanethiol | Eicosanethiol |
| Ethanethiol | 2-propenethiol |
| n-Propanethiol | 4-octenethiol |
| Tertiary-butanethiol | 2,4,6-triethyloctanethiol |
| Octanethiol | 2-cyclohexenethiol |
| Cyclooctanethiol | 4-cyclooctenethiol |
| Heptadecanethiol | |

These thiols, their homologs and analogs illustrate the thiols which are employed in the practice of this invention.

The halogenated compounds which are employed are olefins having 2 to 20 carbon atoms. The halogen is selected from the group chlorine, bromine and iodine. These compounds have the structure

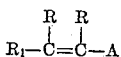

where A represents a halogen selected from the group consisting of chlorine, bromine and iodine and a halogen substituted hydrocarbon radical; $R_1$ represents hydrogen and monovalent hydrocarbon radicals selected from the group consisting of aliphatic, alicyclic and aromatic hydrocarbon groups; R represents a radical selected from the group consisting of hydrogen, alkyl and cycloalkyl, and the two R groups can represent carbon atoms which, together with the attached carbon atoms, form five- and six-membered carbocyclic rings; and the total number of carbon atoms in the compound is 2 to 20.

It has been disclosed in copending application Serial Number 753,098, filed August 4, 1958, that certain of these halogenated compounds which have 2 to 20 carbon atoms in the molecule and which have the structures

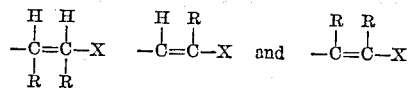

where R can be hydrogen, alkyl and cycloalkyl, and any two R groups can also represent carbon atoms in a ring structure, and where X is a halogen selected from the group consisting of chlorine, bromine and iodine, can react with hydrogen sulfide and the described thiols under conditions to effect a dehydrohalogenation reaction and produce unsaturated compounds. When the promoters of this invention are employed with such monoolefins, there can result an enhanced yield of unsaturated thiols and unsaturated mercaptans.

Examples of the halogenated, unsaturated compounds used in the reaction of this invention are:

| | |
|---|---|
| Vinyl chloride | 1-chlorooctadecene-1 |
| Allyl chloride | 18-chlorooctadecene-1 |
| Methallyl chloride | 18-chloro-2,3-dimethyl- |
| 1-chlorobutene-1 | octadecene-1 |
| 1-chlorobutene-2 | 16-chlorohexadecene-1 |
| 1-chloropropene-1 | 1-chlorocyclohexene |
| 2-chloropropene-1 | 1-chloro-2,5-diethyl- |
| 1-chloro-3-methylbutene-1 | cyclohexene |
| 2-chloro-3-methylbutene-2 | ($\alpha$-Chlorovinyl)cyclohexane |
| 3-chlorohexene | ($\beta$-Chlorovinyl)cyclohexane |
| 4-chlorohexene | ($\beta$-Chlorovinyl) |
| 1-chloro-5-methylhexene-3 | cyclohexene-3 |
| 3-(chloromethyl)heptane | ($\beta$-Chlorovinyl)cyclo- |
| 1-chlorodecene-1 | hexene-2 |
| 12-chlorododecene-1 | ($\beta$-Chlorovinyl)benzene |
| 1-chlorodecene-5 | ($\beta$-Chlorovinyl)2,4,6- |
| 1-chloro-4-ethyl-7-methylnonene-3 | triethylbenzene |
| 2-chloro-6,12-diethyl-hexadecene-8 | 3-chloro-2,3-dimethyl-butene-1 |
| | 2-chlorobutene-2 |

For each chlorine-containing compound, the corresponding bromine and iodine compounds can be employed.

Examples of products which are produced by the reaction conducted as herein disclosed include the following:

| | |
|---|---|
| Diallyl sulfide | Eicosanyl decenyl-1 sulfide |
| Methyl allyl sulfide | Di(octenyl-1) sulfide |
| Ethyl allyl sulfide | 2-chloromethanethiol |
| n-Propyl allyl sulfide | 2-chloroethyl methyl sulfide |
| n-Octyl allyl sulfide | 3-chloropropyl n-octyl sulfide |
| n-Octyl vinyl sulfide | 2-chloroethyl methyl sulfide |
| 2-methyl-2-propenyl n-octyl sulfide | 6-chlorohexyl n-butyl sulfide |
| 2-methyl-2-propenyl tert-octyl sulfide | 3-chlorohexyl eicosanyl sulfide |
| Di(2-methyl-2-propenyl) sulfide | 2-chloroethyl cyclohexyl sulfide |
| 2-cyclohexylvinyl ethyl sulfide | 3-chlorobutanethiol |
| 2,4,6-triethyloctyl 2-butenyl sulfide | 8-chlorooctanethiol |
| 4-octenyl n-octyl sulfide | |
| 4-cyclooctenyl octadecenyl-1 sulfide | |

For each of the chlorinated products named above, there can be prepared the corresponding bromine and iodine compounds.

Recovery of the desired products from the reaction mixture poses no problem. This can be readily done by well known separation means. Commonly, distillation is employed. Distillation at reduced pressures, e.g., 0.01 to 50 mm. of mercury, is frequently preferred. The various cuts obtainable in this manner can be further purified, if desired.

EXAMPLE I

*Preparation of 3-Chloropropyl n-Octyl Sulfide*

The ultraviolet light promoted addition of n-octyl thiol to allyl chloride was carried out at atmospheric pressure in a glass reactor. The main body of the reactor consisted of a 9-inch section of 75 mm. Pyrex glass tubing. One end of the tubing was closed and a 40/50 standard taper female joint was fastened in the other end. A glass cooling coil was wound around the inside of the tube to provide a means of controlling the temperature. Stopcocks were fastened near each end and perpendicular to the axis of the 75-mm. tube so that the reactor could be vented prior to a reaction and also to provide a way to add additional material during a reaction. A small stopcock was also fastened in the end of the reactor containing the joint so that small samples could be removed. A quartz thimble, six inches long, 33-mm. O.D., and provided with a flanged joint, was placed on the mating joint of the reactor and a mercury vapor lamp fastened in the thimble. The capacity of the reactor was about 700 cc. After the reactor had been charged, it was mounted on a horizontal shaker and shaken at about 120 cycles per minute to provide agitation for the reactants. Three hundred and sixty-five (365) grams (2.5 mols) of n-octyl mercaptan and 200 grams (5 percent excess) of allyl chloride, together with the reaction promoters and/or modifiers, if any, were charged to the reactor at room temperature. The reactor was vented with nitrogen and the contents of the reactor were irradiated through the quartz thimble with the rays from a 100-watt mercury vapor lamp. The mercury lamp had been previously turned on for five minutes or longer to obtain a steady state. Tap water, having a temperature of 60 to 70° F., was circulated through the cooling coil. The reaction temperature for the various runs was initially between 72 and 77° F., increased during the first few minutes to maximum values between 102 and 117° F. and, then, gradually decreased as the reaction rate decreased. The reaction rate decrease was indicated by measurement of the refractive index of the reaction mixture. Each run was terminated after a 70-minute period.

For runs containing the anion exchange resins, the resin was removed by decantation and washed with two 100 ml. portions of ethyl ether. The ether was combined with the reaction mixture. For one run wherein lime was employed, the reaction mixture was filtered and the solids were washed with a small portion of ether which was combined with the filtered reaction mixture.

The resulting reaction mixtures were transferred to a distillation flask. Most of the unreacted allyl chloride was stripped off at atmospheric pressure by heating to about 150° C. The remaining fraction was distilled at reduced pressure to yield unreacted n-octyl thiol, the 3-chloropropyl n-octyl sulfide, and some higher boiling residue. The ultimate yield was calculated by taking into consideration the amount of unconverted mercaptan. The percent conversion of the mercaptan to the product was computed using the amount of product recovered and the amount of thiol taken for reaction.

TABLE I
PART A.—MERCAPTAN NOT DISTILLED BEFORE USE

| Run No. | Additive | Additive, g. | Conversion of thiol [1], percent | Ultimate yeild [2], percent |
|---|---|---|---|---|
| 1 | None | 0 | 39.0 | 77.7 |
| 2 | CaO | 10 | 48.5 | 79.0 |
| 3 | Resin [3] | 25 | 59.6 | 85.0 |
| 4 | ___do [3] | 50 | 59.6 | 82.8 |
| 5 | Propylene oxide | 8.3 | 67.0 | 88.0 |
| 6 | ___do | 8.3 | 65.3 | 87.5 |

PART B.—MERCAPTAN DISTILLED PRIOR TO USE

| 7 | None | 0 | 58.0 | 87.4 |
|---|---|---|---|---|
| 8 | Resin | 50 | 64.4 | 85.4 |
| 9 | Propylene oxide | 8.3 | 63.6 | 86.3 |
| 10 | Propylene oxide with thio-beta-naphthol. | 8.3 / 0.1 | 65.7 | 89.5 |
| 11 | Propylene oxide with α,α-azodiisobutyronitrile. | 8.3 / 0.1 | 69.8 | 88.0 |

[1] Conversion is based on the amount of total thiol and the amount of product.
[2] Ultimate yield is based on the amount of thiol taken less the amount recovered and the amount of product.
[3] The anion exchange resin is Amberlite IRA-400, Rohm and Haas Company, employed in the air-dried, hydroxide form.

The data for Part A of Table I show that, in the absence of the reaction modifiers of this invention, the conversion and ultimate yields are only 39.0 and 77.7 percent, respectively. Run 2 compared with run 1 shows that a typical alkali, such as lime, can give slightly improved results. However, when using the anion exchange resin, as for runs 3 and 4, or the propylene oxide, as for duplicate runs 5 and 6, the conversion is increased to more than 59 percent and the yields are greater than 82.8 percent. These improved results are attributed to the use of the additives of this invention.

For Part B of Table I, the runs were made as for Part A, except that the n-octyl thiol was distilled prior to use. This was done since it is known that this reactant under the conditions of storage can be converted slowly to disulfides. To remove such impurities, the product was distilled. Comparison of runs 8 and 9 with run 7 shows that the modifiers of this invention increased the conversion from 58.0 to 63.6 percent or higher, although the ultimate yields were reduced as much as two percent.

Runs No. 10 and 11 were made using the promoters of this invention in conjunction with thio-beta-naphthol and a prior art modifier, α,α-azodiisobutyronitrile. The use of these modifiers in conjunction with propylene oxide gave improved results as can be seen by comparison of runs 10 and 11 with run 9.

U.S. 2,551,813 describes use of azo compounds to promote addition of hydrogen sulfide to ethylenically unsaturated compounds. Such azo compounds are useful in conjunction with the promoters which are disclosed. The preferred azo compounds have the structure $$R_2-N=N-R_2$$

where $R_2$ is an aliphatic and alicyclic radical having 4 to 9 carbon atoms and at least one $R_2$ group in the compound is tertiary and has attached through carbon a negative radical selected from the group nitrile, carbalkoxy and carbonamide and said carbalkoxy radicals have alkyl radicals having 1 to 6 carbons.

Examples of these azo compounds are illustrated by the following:

Alapha,alpha'-azodiisobutyronitrile
Alpha,alpha'-azobis(alpha,gamma-dimethylvaleronitrile)
Alpha,alpha'-azobis(alpha-ethylbutyronitrile)
Alpha,alpha'-azobis(alpha-cyclohexylpropionitrile)
Alpha,alpha'-azobis(alpha-methyl-gamma-carboxybutyronitrile)
Alpha(carbamylazo)isobutyronitrile
Alpha(carbamylazo)-alpha-cyclohexylpropionitrile
Alpha(carbamylazo)isobutyramide
Alpha(carbamylazo)-alpha,gamma-dimethylvaleramide
Hexyl alpha(carbamylazo)-alpha,gamma-dimethylvalerate In lieu of the thio-beta-naphthol, there can be used a benzene thiol or a naphthalene thiol or the alkyl derivatives thereof, the compounds having the following structural characteristics

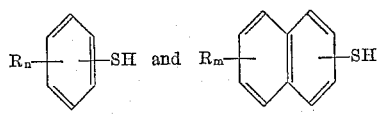

where R is an alkyl group containing 1 to 10 carbon atoms, $n$ is an integer from 0 to 5 and $m$ is an integer from 0 to 7, and wherein the compound contains a total of from 6 to 36 carbon atoms.

Examples of these promoters are illustrated by the following compounds:

Benzenethiol
2-methylbenzenethiol
4-methylbenzenethiol
3,5-diethylbenzenethiol
2-methyl-3-isopropylbenzenethiol
4-octylbenzenethiol
4-(2-methylheptyl)benzenethiol
3-decylbenzenethiol
2,3,5-tridecylbenzenethiol
2,3,4,5,6-pentamethylbenzenethiol
1-naphthalenethiol
2-naphthalenethiol
1,4-dimethyl-2-naphthalenethiol
1,3,6,8-tetraethyl-2-naphthalenethiol
2,8-dihexyl-1-naphthalenethiol
4-(2-ethylhexyl)-1-naphthalenethiol
1,6-didecyl-2-naphthalenethiol
1,3,4,5,6,7,8-heptamethyl-2-naphthalenethiol

EXAMPLE II

A commercial sample of n-octyl thiol was flash distilled and reacted with allyl chloride using the apparatus and the procedure described in Example I. For each run, 365 grams of the mercaptan were mixed with 200 grams of allyl chloride and the reaction promotors, if any, in amount reported in Table II. For these runs, the initial reaction temperatures were 72±2° F., and the maximum values for the various runs were between 94 to 101° F.

TABLE II

| Run No. | Additive | Additive, g. | Conversion of thiol,[1] percent | Ultimate Yield,[2] percent |
|---|---|---|---|---|
| 12 | None | 0 | 55.2 | 89.9 |
| 13 | Ethylene oxide | 9.0 | 78.0 | 90.2 |
| 14 | Propylene oxide | 8.3 | 75.5 | 90.5 |

[1] Conversion is based on the amount of total thiol and the amount of product, 3-chloropropyl n-octyl sulfide.
[2] Ultimate yield is based on the amount of thiol taken less the amount recovered and the amount of product.

These data substantiate the results presented in Table I with regard to propylene oxide and also show that use of ethylene oxide resulted in a slightly higher conversion and substantially the same ultimate yield.

Reasonable variation and modification are possible within the scope of the foregoing disclosure and the appended claims to the invention the essence of which is that reaction between a sulfur-containing compound and a halogen-containing olefinic compound in the presence of activating rays can be promoted to obtain higher yields and higher per pass conversions by effecting the reaction in the presence of a material selected from the group consisting of an anion exchange resin and an epoxy-containing organic compound and, more specifically, in conjunction with a modifier, as further described herein.

I claim:

1. A method of promoting a reaction between a sulfur-containing compound which is reactive with a halogen-containing olefinic compound in the presence of activating rays having a wave length of about 100 to 3,800 angstroms to produce a compound selected from the group consisting of a thiol and a sulfide which comprises effecting the reaction in the presence of a material selected from the group consisting of an anion exchange resin and an epoxy-containing organic compound.

2. A method of promoting a reaction between a sulfur-containing compound which is reactive with a halogen-containing olefinic compound in the presence of activating rays having a wave length of about 100 to 3,800 angstroms to produce a compound selected from the group consisting of a thiol and a sulfide which comprises effecting the reaction in the presence of an anion exchange resin.

3. A method of promoting a reaction between a sulfur-containing compound which is reactive with a halogen-containing olefinic compound in the presence of activating rays having a wave length of about 100 to 3,800 angstroms to produce a compound selected from the group consisting of a thiol and a sulfide which comprises effecting the reaction in the presence of an epoxy-containing organic compound.

4. A process according to claim 3 in which there is employed about 1 to 100 grams per mol of halogen-containing olefinic compound of a compound which has the characteristic structure $$R_2-N=N-R_2$$

wherein $R_2$ is selected from the group consisting of an aliphatic and an alicyclic radical having 4 to 9 carbon atoms and at least one $R_2$ group in the compound is tertiary and has attached through carbon a negative radical selected from the group consisting of nitrile, carbalkoxy and carbonamide and wherein said carbalkoxy radicals have alkyl radicals having 1 to 6 carbons.

5. A process according to claim 3 wherein there is also employed about 1 to 100 grams per mol of halogen-containing olefinic compound of a compound selected from the group consisting of benzene thiols and naphthalene thiols and the alkyl derivatives thereof, the compounds having formula selected from the following:

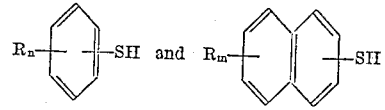

wherein R is an alkyl group containing 1–10 carbon atoms, $n$ is an integer in the range 0–5 and $m$ is an integer in the range 0–7, and wherein the compound contains a total of from 6–36 carbon atoms.

6. A process according to claim 3 wherein there is also employed during the reaction alpha,alpha-azodiisobutyronitrile.

7. A process according to claim 3 wherein there is also employed during the reaction thio-beta-naphthol.

8. A method of promoting a reaction between a sulfur-containing compound which is reactive with a halogen-containing olefinic compound having the structure

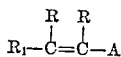

wherein A represents a halogen selected from the group consisting of chlorine, bromine and iodine and a halogenated substituted hydrocarbon radical; $R_1$ represents a substituent selected from the group consisting of hydrogen and monovalent hydrocarbon radicals; R represents a radical selected from the group consisting of hydrogen, alkyl and cycloalkyl; the two R groups can represent carbon atoms which, together with the attached carbon atoms, form five- and six-membered carbocyclic rings; and the total number of carbon atoms in the compound is 2–20, in the presence of activating rays having a wave length of about 100 to 3,800 angstroms to produce a compound selected from the group consisting of a thiol and a sulfide which comprises effecting the reaction in the presence of a material selected from the group consisting of an anion exchange resin and an epoxy-containing organic compound.

9. The preparation of 3-chloropropyl n-octyl sulfide which comprises irradiating with a mercury vapor lamp n-octyl mercaptan in admixture with allyl chloride and in the presence of propylene oxide as a reaction improver.

10. A process according to claim 9 wherein there is also present about 1 to 100 grams per mol of allyl chloride of a modifier selected from thio-beta-naphthol and alpha,alpha-azodiisobutyronitrile.

11. The preparation of 3-chloro n-octyl sulfide which comprises irradiating with a mercury vapor lamp n-octyl mercaptan in admixture with allyl chloride and in the presence of a polystyrene quaternary amine anion exchange resin as a reaction improver.

12. A method of promoting a reaction between an aliphatic thiol containing from 1 to 20 carbon atoms which is reactive with a halogen-containing olefinic compound in the presence of activating rays having a wave length of about 100 to 3,800 angstroms to produce a compound selected from the group consisting of the thiol and the sulfide which comprises effecting the reaction in the presence of a material selected from the group consisting of an anion exchange resin and an epoxy-containing organic compound.

13. A method of promoting a reaction between a sulfur-containing compound which is reactive with a halogen-containing olefinic compound in the presence of high energy ionizing rays to produce a compound selected from the group consisting of a thiol and a sulfide which comprises effecting the reaction in the presence of a material selected from the group consisting of an anion exchange resin and an epoxy-containing organic compound.

14. A method of promoting a reaction between a sulfur-containing compound which is reactive with a halogen-containing olefinic compound in the presence of high energy ionizing rays to produce a compound selected from the group consisting of a thiol and a sulfide which comprises effecting the reaction in the presence of an anion exchange resin.

15. A method of promoting a reaction between a sulfur-containing compound which is reactive with a halogen-containing olefinic compound in the presence of high energy ionizing rays to produce a compound selected from the group consisting of a thiol and a sulfide which comprises effecting the reaction in the presence of an epoxy-containing organic compound.

16. A process according to claim 15 in which there is employed about 1 to 100 grams per mol of halogen-containing olefinic compound of a compound which has the characteristic structure $$R_2-N=N-R_2$$

wherein $R_2$ is an aliphatic or an alicyclic radical having 4 to 9 carbon atoms and at least one $R_2$ group in the compound is tertiary and has attached through carbon a negative radical selected from the group consisting of nitrile, carbalkoxy and carbonamide and wherein said carbalkoxy radicals having alkyl radicals having 1 to 6 carbon atoms.

17. A process according to claim 15 wherein there is also employed about 1 to 100 grams per mol of halogen-containing olefinic compound of a compound selected from the group consisting of benzene thiols and naphthylene thiols and the alkyl derivatives thereof, the compounds having a formula selected from the following:

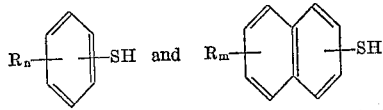

wherein R is an alkyl group containing 1–10 carbon atoms, $n$ is an integer in the range 0–5 and $m$ is an integer in the range 0–7, and wherein the compound contains a total of from 6–36 carbon atoms.

18. A process according to claim 15 wherein there is also employed during the reaction alpha,alpha-azodiisobutyronitrile.

19. A process according to claim 15 wherein there is also employed during the reaction thio-beta-naphthol.

20. A method of promoting a reaction between a sulfur-containing compound which is reactive with a halogen-containing olefinic compound having the structure

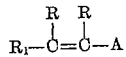

wherein A represents a halogen selected from the group consisting of chlorine, bromine and iodine and a halogenated substituted hydrocarbon radical; $R_1$ represents a substituent selected from the group consisting of hydrogen and monovalent hydrocarbon radicals; R represents a radical selected from the group consisting of hydrogen, alkyl and cycloalkyl; the two R groups can represent carbon atoms which, together with the attached carbon atoms, form five- and six-membered carbocyclic rings; and the total number of carbon atoms in the compound is 2–20, in the presence of high energy ionizing rays to produce a compound selected from the group consisting of a thiol and a sulfide which comprises effecting the reaction in the presence of a material selected from the group consisting of an anion exchange resin and an epoxy-containing organic compound.

21. The preparation of 3-chloropropyl n-octyl sulfide which comprises irradiating with high energy ionizing rays n-octyl mercaptan in admixture with allyl chloride and in the presence of propylene oxide as a reaction improver.

22. A process according to claim 21 wherein there is also present about 1 to 100 grams per mol of allyl chloride of a modifier selected from thio-beta-naphthol and alpha,alpha-azodiisobutyronitrile.

23. The preparation of 3-chloro n-octyl sulfide which comprises irradiating with high energy ionizing rays n-octyl mercaptan in admixture with allyl chloride and in the presence of a polystyrene quaternary amine anion exchange resin as a reaction improver.

24. A method of promoting a reaction between an aliphatic thiol containing from 1 to 20 carbon atoms which is reactive with a halogen-containing olefinic compound in the presence of high energy ionizing rays to produce a compound selected from the group consisting of the thiol and the sulfide which comprises effecting the reaction in the presence of a material selected from the group consisting of an anion exchange resin and an epoxy-containing organic compound.

References Cited in the file of this patent

UNITED STATES PATENTS

| 2,366,008 | D'Alelio | Dec. 26, 1944 |
| 2,398,480 | Vaughan et al. | Apr. 16, 1946 |
| 2,551,813 | Pinkney | May 8, 1951 |